United States Patent
Dave (10) Patent No.: US 11,003,658 B2
(45) Date of Patent: May 11, 2021

(54) SELECTIVELY RETRIEVING DATA FROM REMOTE SHARE NOTHING COMPUTER CLUSTERS

(71) Applicant: INTERNATIONAL BUSINESS MACHINES CORPORATION, Armonk, NY (US)

(72) Inventor: Abhishek S. Dave, Pune (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 546 days.

(21) Appl. No.: 15/357,305

(22) Filed: Nov. 21, 2016

(65) Prior Publication Data

US 2018/0144026 A1   May 24, 2018

(51) Int. Cl.
*G06F 16/00* (2019.01)
*G06F 16/2453* (2019.01)
(Continued)

(52) U.S. Cl.
CPC .......... *G06F 16/2453* (2019.01); *G06F 16/14* (2019.01); *G06F 16/148* (2019.01);
(Continued)

(58) Field of Classification Search
CPC .. G06F 16/14; G06F 16/2453; G06F 16/1727; G06F 16/176; G06F 16/951;
(Continued)

(56) References Cited

U.S. PATENT DOCUMENTS

| | | | |
|---|---|---|---|
| 6,480,837 B1* | 11/2002 | Dutta | G06F 16/951 |
| 6,564,228 B1* | 5/2003 | O'Connor | G06F 3/0604 |

(Continued)

FOREIGN PATENT DOCUMENTS

WO    2015126957 A1    8/2015

OTHER PUBLICATIONS

Mell et al., "The NIST Definition of Cloud Computing," National Institute of Standards and Technology, Sep. 2011, p. 1-3, Special Publication 800-145.

*Primary Examiner* — Shiow-Jy Fan
(74) *Attorney, Agent, or Firm* — Steven M. Bouknight (57) ABSTRACT

A method for selectively retrieving requested data files associated with computer cluster systems based on metadata associated with the requested data files is provided. The method may include receiving data retrieval requests, wherein the data retrieval requests include a request to retrieve requested data files. The method may also include querying the metadata associated with the requested data files, wherein the queried metadata determines a location affinity of data blocks associated with the requested data files located on a remote cluster associated with the computer cluster system. The method may further include based on the queried metadata, determining at least one server associated with the computer cluster system that is locally available and provides an optimum access to the requested data files. The method may also include, selecting the determined at least one server that provides the optimum access to retrieve the requested data files.

20 Claims, 6 Drawing Sheets

(51) Int. Cl.
*G06F 16/14* (2019.01)
*G06F 16/176* (2019.01)
*G06F 16/951* (2019.01)
*G06F 16/17* (2019.01)

(52) U.S. Cl.
CPC ........ *G06F 16/176* (2019.01); *G06F 16/1727* (2019.01); *G06F 16/951* (2019.01)

(58) Field of Classification Search
CPC ............ G06F 16/148; G06F 17/30442; G06F 17/30106; G06F 17/30864; G06F 17/30165; G06F 17/30138
USPC .................................................. 707/770, 213
See application file for complete search history.

(56) References Cited

U.S. PATENT DOCUMENTS

| | | | | |
|---|---|---|---|---|
| 7,281,032 B2* | 10/2007 | Kodama | ................ | H04L 29/06 707/999.202 |
| 7,526,686 B2* | 4/2009 | Kolvick, Jr. | ........ | G06F 11/1076 714/54 |
| 7,979,509 B1* | 7/2011 | Malmskog | .......... | H04L 67/2885 709/213 |
| 8,805,790 B1* | 8/2014 | Chan | .................. | G06F 11/1464 707/652 |
| 8,886,607 B2* | 11/2014 | Yucel | .................. | G06F 11/1415 707/640 |
| 9,348,842 B2* | 5/2016 | Wu | ..................... | G06F 12/0862 |
| 9,678,981 B1* | 6/2017 | Taylor | .................. | G06F 16/122 |
| 2002/0133491 A1* | 9/2002 | Sim | ..................... | H04L 67/1023 |
| 2008/0071907 A1* | 3/2008 | Thompson | ............ | H04L 67/104 709/224 |
| 2008/0104027 A1* | 5/2008 | Imler | .................. | G06F 3/04842 |
| 2009/0178087 A1* | 7/2009 | Menn | .................... | H04L 1/1838 725/86 |
| 2011/0055261 A1* | 3/2011 | Makkar | ............... | H04L 67/1097 707/770 |
| 2011/0145367 A1* | 6/2011 | Ananthanarayanan | ...................... | G06F 16/1858 709/219 |
| 2012/0291088 A1* | 11/2012 | Srivastava | ............ | G06F 9/5072 726/1 |
| 2013/0111262 A1* | 5/2013 | Taylor | ................. | G06F 11/2005 714/4.11 |
| 2014/0007239 A1* | 1/2014 | Sharpe | .................. | G06F 21/561 726/24 |
| 2014/0310373 A1 | 10/2014 | Aviles et al. | | |
| 2015/0234922 A1* | 8/2015 | Dageville | ............... | G06F 16/27 707/770 |
| 2015/0261468 A1* | 9/2015 | Khoyi | ..................... | G06F 11/00 711/114 |
| 2015/0350299 A1* | 12/2015 | Pineas | ..................... | G06F 16/16 709/203 |
| 2016/0127467 A1* | 5/2016 | Mu | ..................... | H04L 67/1097 709/213 |
| 2016/0150047 A1* | 5/2016 | O'Hare | ................. | G06F 3/0619 713/168 |
| 2017/0004415 A1* | 1/2017 | Moretti | .................... | G09B 5/00 |

* cited by examiner

SELECTIVELY RETRIEVING DATA FROM REMOTE SHARE NOTHING COMPUTER CLUSTERS

BACKGROUND

The present invention relates generally to the field of computing, and more specifically, to data communication.

Generally, computer clusters consist of a set of connected computers/servers that may communicate and work together so that, in many respects, they can be viewed as a single system. Typically, computer clusters have node sets comprising nodes to perform the same or different tasks which may be controlled and/or scheduled by different software. Examples of computer cluster architectures may include share nothing architectures and share everything architectures that may include clusters of servers, with each server having nodes to perform different tasks. Typically, in share everything architectures, the nodes that are associated with the node sets may use/share memory and disk storage; on the contrary, in share nothing architectures, nodes do not use/share memory or disk storage. Share nothing systems are also distinct from systems that may keep large amounts of centrally stored information on a server or any single point of contention, in that the share nothing systems do not have a single point of contention, to thereby eliminate a single point of failure for the share nothing systems.

SUMMARY

A method for selectively retrieving at least one requested data file associated with at least one computer cluster system based on a plurality of metadata associated with the at least one requested data file is provided. The method may include receiving at least one data retrieval request, wherein the at least one data retrieval request includes a request to retrieve the at least one requested data file. The method may also include querying the plurality of metadata associated with the at least one requested data file associated with the received at least one data retrieval request, wherein the queried plurality of metadata determines a location affinity of at least one data block associated with the at least one requested data file on a remote cluster associated with the at least one computer cluster system. The method may further include based on the queried plurality of metadata and the location affinity, determining at least one server associated with the at least one computer cluster system that is locally available and provides an optimum access to the at least one requested data file. The method may also include, selecting the determined at least one local server that provides the optimum access to retrieve the at least one requested data file.

A computer system for retrieving at least one requested data file associated with at least one computer cluster system based on a plurality of metadata associated with the at least one requested data file is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving at least one data retrieval request, wherein the at least one data retrieval request includes a request to retrieve the at least one requested data file. The method may also include querying the plurality of metadata associated with the at least one requested data file associated with the received at least one data retrieval request, wherein the queried plurality of metadata determines a location affinity of at least one data block associated with the at least one requested data file on a remote cluster associated with the at least one computer cluster system. The method may further include based on the queried plurality of metadata and the location affinity, determining at least one server associated with the at least one computer cluster system that is locally available and provides an optimum access to the at least one requested data file. The method may also include, selecting the determined at least one local server that provides the optimum access to retrieve the at least one requested data file.

A computer program product for retrieving at least one requested data file associated with at least one computer cluster system based on a plurality of metadata associated with the at least one requested data file is provided. The computer program product may include one or more computer-readable storage devices and program instructions stored on at least one of the one or more tangible storage devices, the program instructions executable by a processor. The computer program product may include program instructions to receive at least one data retrieval request, wherein the at least one data retrieval request includes a request to retrieve the at least one requested data file. The computer program product may also include program instructions to collect the plurality of metadata associated with the at least one requested data file associated with the received at least one data retrieval request, wherein the queried plurality of metadata determines a location affinity of at least one data block associated with the at least one requested data file on a remote cluster associated with the at least one computer cluster system. The computer program product may further include, based on the queried plurality of metadata and the location affinity, program instructions to determine at least one server associated with the at least one computer cluster system that is locally available and provides an optimum access to the at least one requested data file. The computer program product may also include program instructions to select the determined at least one local server that provides the optimum access to retrieve the at least one requested data file.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to data communication. The following described exemplary embodiments provide a system, method and program product for retrieving requested data files on computer cluster systems by pre-identifying and pre-mapping the requested data files based on metadata associated with the requested data files. Therefore, the present embodiment has the capacity to improve the technical field associated with data file retrieval by retrieving data blocks of requested files from a remote share nothing cluster (SNC). Specifically, the present embodiment may query metadata about the location of the data blocks associated with a file and then retrieve all blocks of a file residing on local storage of that server directly to provide faster data retrieval when compared to the traditional fetching of files from a server without knowing where the data blocks are located.

As previously described with respect to data communication, computer clusters consisting of sets of connected computers/servers may include nodes to perform different tasks. Examples of computer cluster architectures may include share nothing architectures and share everything architectures that may include clusters of servers that have nodes. Typically, and as previously described, the clusters associated with share nothing architectures do not share memory or disk storage. Therefore, with respect to computer cluster systems such as share nothing systems, when a local server associated with a local cluster of servers makes a request for a file that may be stored on a remote cluster of servers, the local server would have to collect information on each of the remote servers associated with the remote cluster servers to find the requested file. In such a scenario, due to the large collection of data by the local server to find the requested data files, data traffic on the local server may increase and thereby cause delays in retrieving the requested data files. As such, it may be advantageous, among other things, to provide a system, method and program product for selectively retrieving requested data files associated with computer cluster systems based on metadata associated with the requested data files by identifying and mapping the location of the data files based on data block information associated with the computer cluster systems and metadata associated with the data files. Specifically, the system, method and program product may identify and map the location of data files on computer cluster systems by retrieving information about data blocks stored on the computer cluster systems and using metadata associated with the data files to determine the server to retrieve the data file in order to increase the speed of retrieving data from share nothing cluster (SNC) servers.

According to at least one implementation of the present embodiment, data retrieval requests may be received. Then, based on the data retrieval requests, metadata information associated with requested data files may be queried to determine the location of data blocks associated with the requested data files. Next, based on the queried metadata information associated with the requested data files, server nodes associated with SNC servers that provide optimum access to retrieve the requested data files may be determined. Then, the SNC servers that are determined to provide optimum access may be selected to retrieve the requested data file.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for selectively retrieving requested data files associated with a computer cluster system based on metadata associated with the requested data files.

According to at least one implementation, data retrieval requests may be received. Then, based on the data retrieval requests, metadata information associated with requested data files may be queried to determine the location of data blocks associated with the requested data files. Next, based on the queried metadata information associated with the requested data files, server nodes associated with SNC servers that provide optimum access to retrieve the requested data files may be determined. Then, the SNC servers that are determined to provide optimum access may be selected to retrieve the requested data file.

Figure 1:
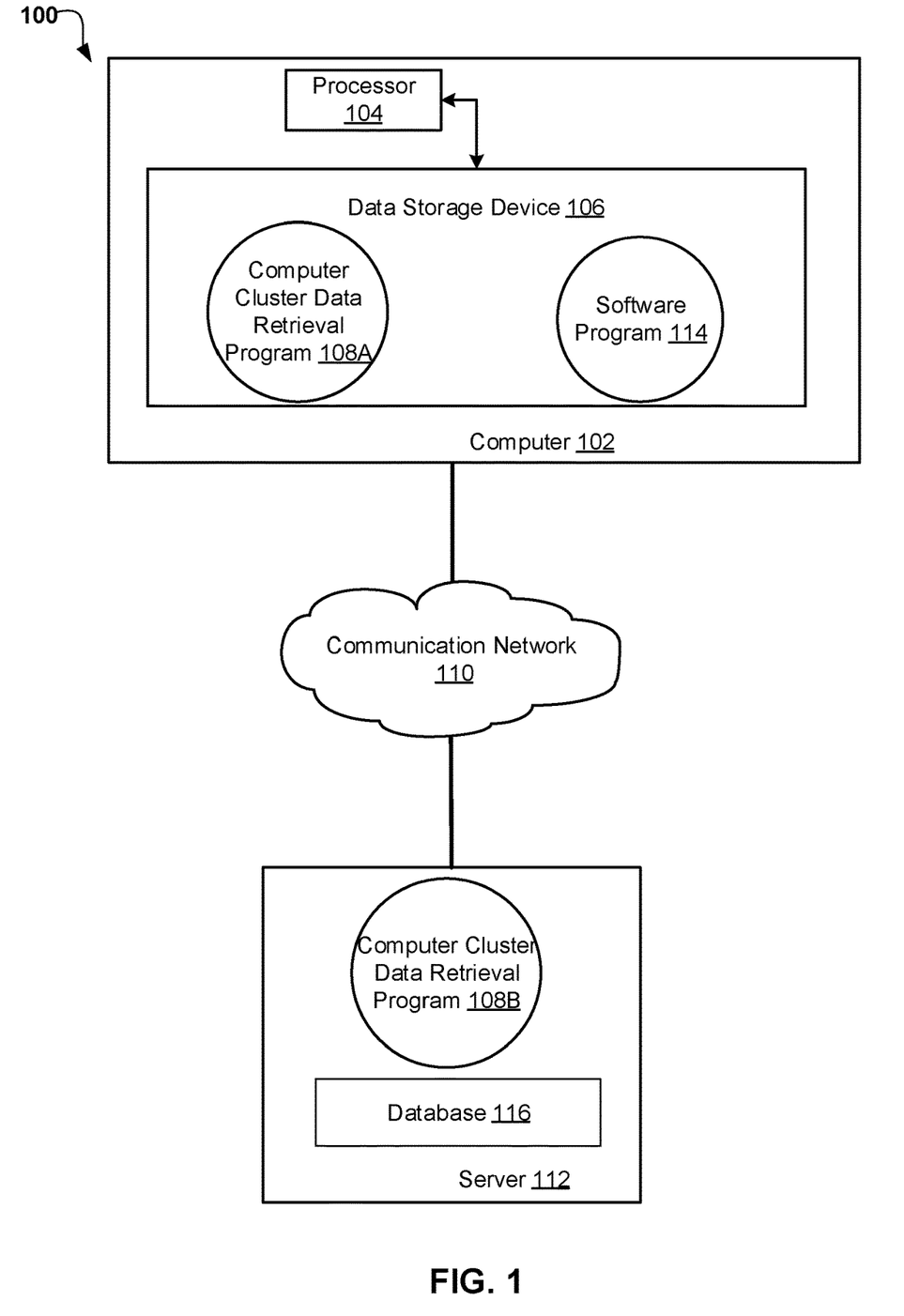
FIG. 1 illustrates a networked computer environment according to one embodiment.

Referring now to FIG. 1, an exemplary networked computer environment 100 in accordance with one embodiment is depicted. The networked computer environment 100 may include a computer 102 with a processor 104 and a data storage device 106 that is enabled to run a computer cluster data retrieval program 108A and a software program 114. The software program 114 may be an application program such as an internet browser and an email program. The computer cluster data retrieval program 108A may communicate with the software program 114. The networked computer environment 100 may also include a server 112 that is enabled to run a computer cluster data retrieval program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may be a node associated with server computer 112 and may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the computer cluster data retrieval program 108A, 108B may interact with a database 116 that may be embedded in various storage devices, such as, but not limited to a mobile device 102, a networked server 112, or a cloud storage service.

According to the present embodiment, a program, such as a computer cluster data retrieval program 108A and 108B may run on the client computer 102 or on the server computer 112 via a communications network 110. The computer cluster data retrieval program 108A, 108B may selectively retrieve requested data files associated with a computer cluster system based on metadata associated with the requested data files. Specifically, a user using a computer, such as computer 102, may run a computer cluster data retrieval program 108A, 108B, that interacts with a computer cluster and may selectively retrieve requested data files associated with a computer cluster system based on metadata associated with the requested data files by identifying information and mapping the location of the requested data files and selecting the server to retrieve the requested data files.

Figure 2:
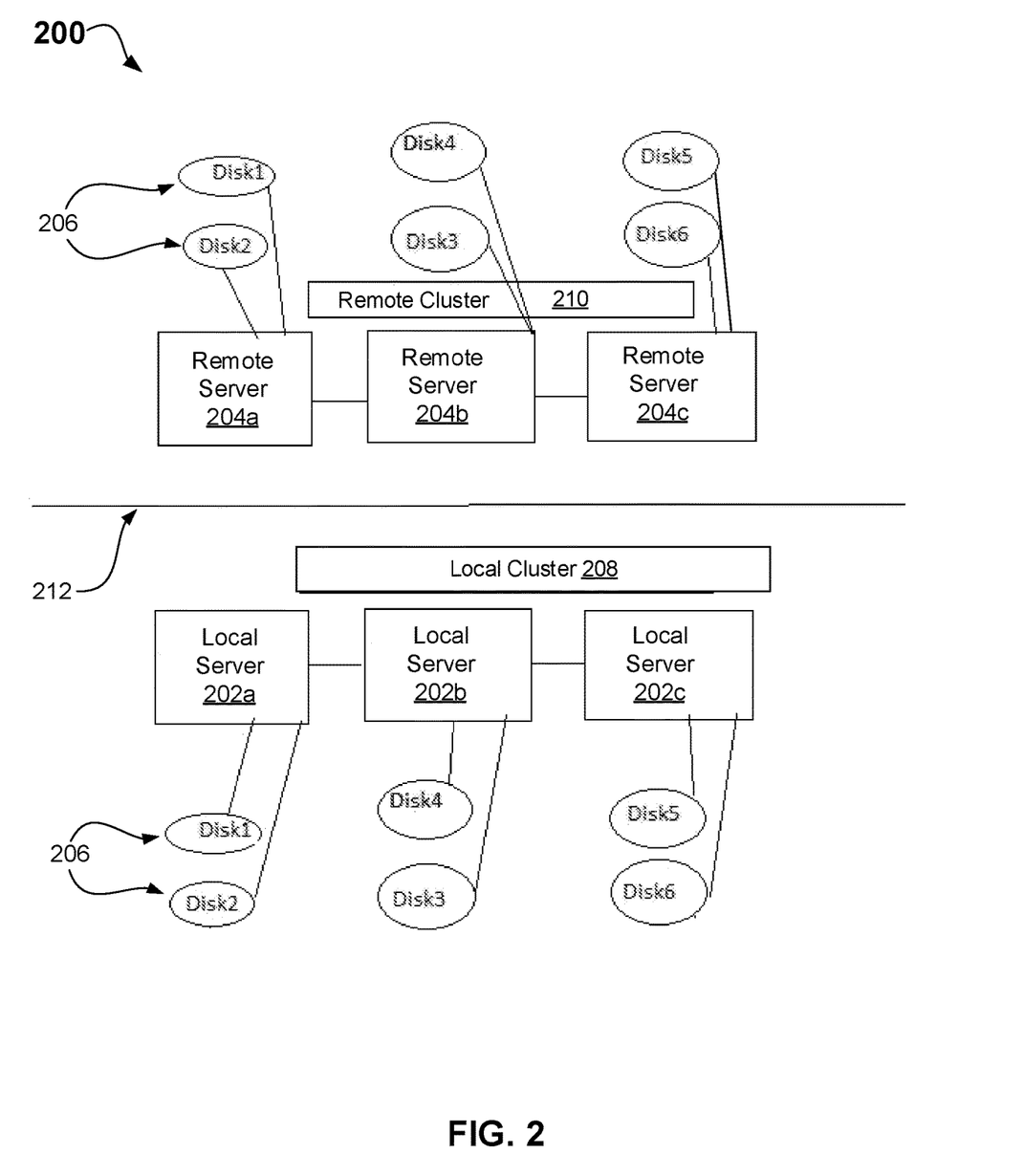
FIG. 2 is an example of computer cluster system according to one embodiment.

Referring now to FIG. 2, an example 200 of a computer cluster system according to one embodiment is depicted. As previously described in FIG. 1, the computer cluster data retrieval program 108A, 108B (FIG. 1) may interact with a computer cluster system to selectively retrieve requested data files associated with a computer cluster system based on metadata associated with the requested data files. Specifically, according to one embodiment, the computer cluster system 200 may include a local cluster 208 that may be a cache share nothing cluster (SNC) or share everything cluster, and that includes local servers 202a, 202b, and 202c. Additionally, the computer cluster system 200 may include a remote cluster 210 that may be a remote SNC or share everything cluster that includes remote servers 204a, 204b, and 204c. Furthermore, each local server 202a, 202b, and 202c and each remote server 204a, 204b, and 204c may include disks 206 that further include data blocks to store information, as well as include sets of interconnected nodes that may include one or more client computers 102 (FIG. 1). Also, local servers 202a, 202b, 202c may communicate with remote servers 204a, 204b, and 204c via the interconnected nodes and/or via a network 212 such as a local area network or a wireless network.

Figure 3:
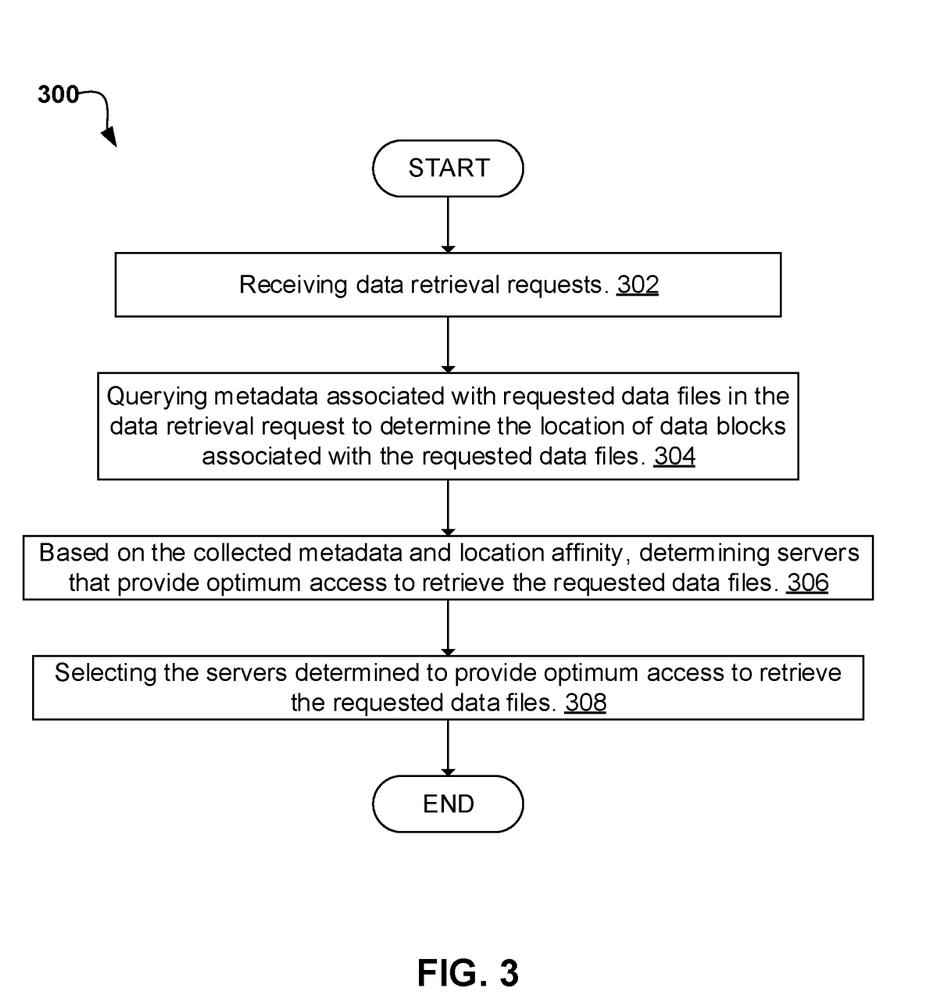
FIG. 3 is an operational flowchart illustrating the steps carried out by a program for selectively retrieving requested data files associated with a computer cluster system based on metadata associated with the requested data files according to one embodiment.

Referring now to FIG. 3, an operational flowchart 300 that illustrates the steps carried out by a program for selectively retrieving requested data files associated with a computer cluster system based on metadata associated with the requested data files in accordance with one embodiment is depicted. At 302, the computer cluster data retrieval program 108A, 108B (FIG. 1) may receive data retrieval requests. Specifically, for example, the computer cluster data retrieval program 108A, 108B (FIG. 1) may receive data retrieval requests via the interconnected nodes at a local cluster 208 (FIG. 2), and the data retrieval requests may include a request to retrieve one or more requested data files from the local cluster 208 (FIG. 2) and/or the remote cluster 210 (FIG. 2). For example, the computer cluster data retrieval program 108A, 108B (FIG. 1) may receive a data retrieval request on a node associated with local server 202a (FIG. 2) for one or more requested data files such as a data file A, a data file B, and/or a data file C.

Then, at 304, the computer cluster data retrieval program 108A, 108B (FIG. 1) may query metadata associated with the requested data files of the data retrieval requests to determine the location of data blocks associated with the requested data files. For example, the computer cluster data retrieval program 108A, 108B (FIG. 1) may query metadata, or collect metadata, to determine the location of the data blocks associated with the requested data file on the remote clusters 210 (FIG. 2). Specifically, the computer cluster data retrieval program 108A, 108B (FIG. 1) may query the metadata to determine the location affinity of the data blocks, or the proximity of the data blocks based on a determination that the data blocks are locally available to the local server 202a, 202b, and 202c (FIG. 2) and/or the remote server 204a, 204b, and 204c (FIG. 2) that receives the data retrieval request, by selecting a server directory associated with nodes of the local clusters 208 (FIG. 2) and/or remote clusters 210 (FIG. 2) based on the queried metadata. More specifically, the queried metadata may include inode information associated with the local cluster 208 (FIG. 2) and/or the remote cluster 210 (FIG. 2) based on the requested data files, the number of data blocks allocated to the requested data files, data block information related to the requested data file, the location of the data blocks that may store the requested data file, and the location affinity of the local servers 202a, 202b, and 202c (FIG. 2) and/or the remote servers 204a, 204b, and 204c (FIG. 2) that store the requested data files, whereby the location affinity may include the proximity of the data blocks associated with the requested data file to the local server 202a, 202b, and 202c (FIG. 2) and/or the remote server 204a, 204b, and 204c (FIG. 2) that receives the data retrieval request. For example, the computer cluster data retrieval program 108A, 108B (FIG. 1) may receive a data retrieval request for a data file A, a data file B, and/or a data file C. Thereafter, based on the received data retrieval request, the computer cluster data retrieval program 108A, 108B (FIG. 1) may query metadata associated with the data file A, the data file B, and/or the data file C. More specifically, for example, based on the queried metadata, the computer cluster data retrieval program 108A, 108B (FIG. 1) may retrieve data block information to identify and map the data file A that may have 100% of data blocks stored on disks 206 (FIG. 2), such as disk 1 and disk 2 of the remote server 204a (FIG. 2), a data file B that may have 80% of data blocks stored on disk 3 and disk 4 of the remote server 204b (FIG. 2) and 20% of data blocks stored on disk 5 and disk 6 of the remote server 204c (FIG. 2), and a data file C that may have 70% of data blocks stored on disk 5 and disk 6 of the remote server 204c (FIG. 2) and 30% of data blocks stored on disk 3 and disk 4 of the remote server 204b (FIG. 2).

Next, at 306, based on the queried metadata and the location affinity associated with the requested data files, the computer cluster data retrieval program 108A, 108B (FIG. 1) may determine the local servers 202a, 202b, and 202c (FIG. 2) and/or the remote servers 204a, 204b, and 204c (FIG. 2) that are locally available and provide optimum access to the requested data files. Specifically, according to one embodiment, the computer cluster data retrieval program 108A, 108B (FIG. 1) may determine whether the local servers 202a, 202b, and 202c (FIG. 2) and/or the remote servers 204a, 204b, and 204c (FIG. 2) provide optimum access to the requested data file based on the queried metadata information such as the number of data blocks allocated to the requested data file on the local servers 202a, 202b, and 202c (FIG. 2) and/or the remote servers 204a, 204b, and 204c (FIG. 2), and the proximity, or the accessibility, the local servers 202a, 202b, and 202c (FIG. 2) receiving the data retrieval requests have to the local servers 202a, 202b, and 202c (FIG. 2) and/or the remote servers 204a, 204b, and 204c (FIG. 2) that store the requested data files. For example, and as previously described at step 304, based on the queried metadata for data files A, B, and C, the computer cluster data retrieval program 108A, 108B (FIG. 1) may retrieve data block information to identify and map the data file A that may have 100% of data blocks stored on disk 1 and disk 2 of the remote server 204a (FIG. 2), a data file B that may have 80% of data blocks stored on disk 3 and disk 4 of the remote server 204b (FIG. 2) and 20% of data blocks stored on disk 5 and disk 6 of the remote server 204c (FIG. 2), and a data file C that may have 70% of data blocks stored on disk 5 and disk 6 of the remote server 204c (FIG. 2) and 30% of data blocks stored on disk 3 and disk 4 of the remote server 204b (FIG. 2).

Therefore, the computer cluster data retrieval program 108A, 108B (FIG. 1) may determine that remote server 204a (FIG. 2) provides optimum access to the data file A based on the 100% of data blocks allocated to the data file A on the remote server 204a (FIG. 2) and the accessibility the local server 202a (FIG. 2) has to the remote server 204a (FIG. 2) via the network 212 (FIG. 2). Furthermore, the computer cluster data retrieval program 108A, 108B (FIG. 1) may determine that remote server 204b (FIG. 2) provides optimum access to the data file B based on the 80% of data blocks allocated to the data file B on the remote server 204b (FIG. 2) and the accessibility the local server 202a (FIG. 2) has to the remote server 204b (FIG. 2) via the network 212 (FIG. 2). Additionally, the computer cluster data retrieval program 108A, 108B (FIG. 1) may determine that remote server 204c (FIG. 2) provides optimum access to the data file C based on the 70% of data blocks allocated to the data file C on the remote server 204c (FIG. 2) and the accessibility the local server 202a (FIG. 2) has to the remote server 204c (FIG. 2) via the network 212 (FIG. 2).

Then, at 308, the computer cluster data retrieval program 108A, 108B (FIG. 1) may select the local servers 202a, 202b, and 202c (FIG. 2) and/or the remote servers 204a, 204b, and 204c (FIG. 2) determined to provide optimum access to retrieve the requested data files. For example, and as previously described, the computer cluster data retrieval program 108A, 108B (FIG. 1) may determine that remote server 204a (FIG. 2) provides optimum access to the data file A, therefore, the computer cluster data retrieval program 108A, 108B (FIG. 1) may select the remote server 204a (FIG. 2) to retrieve the data file A, and thereby retrieve the data file A from the selected remote server 204a (FIG. 2).

It may be appreciated that FIGS. 2 and 3 provide only illustrations of one implementation and do not imply any limitations with regard to how different embodiments may be implemented. Many modifications to the depicted environments may be made based on design and implementation requirements. Specifically, according to one implementation, the computer cluster data retrieval program 108A, 108B (FIG. 1) may store the queried metadata information on nodes associated with the local cluster 208 (FIG. 2) and the remote cluster 210 (FIG. 2) of the computer cluster system 200 (FIG. 2). For example, the computer cluster data retrieval program 108A, 108B (FIG. 1) may receive a data retrieval request on local server 202a (FIG. 2) that includes a request for the data file A, and may query metadata associated with the data file A based on the data retrieval request. Thereafter, the computer cluster data retrieval program 108A, 108B (FIG. 1) may store the queried metadata, such as the retrieved data block information that identifies and maps the requested data file A, on the node associated with the local server 202a (FIG. 2). Specifically, and as previously described in FIG. 2, local cluster 208 (FIG. 2) and remote cluster 210 (FIG. 2) may include interconnected nodes such as client computers 102 (FIG. 1), and the interconnected nodes may communicate and store the queried metadata information to make the queried metadata information quickly accessible to each node associated with the local cluster 208 (FIG. 2) and the remote cluster 210 (FIG. 2) to enable faster retrieval of the requested data file.

Furthermore, the computer cluster data retrieval program 108A, 108B (FIG. 1) may determine whether the stored queried metadata associated with the requested data files are valid, and in response to the determination that the stored queried metadata information is not valid based on modifications to the requested data file, update the stored queried metadata information based on file modifications to the requested data files. Specifically, the computer cluster data retrieval program 108A, 108B (FIG. 1) may determine whether the stored queried metadata associated with the requested data files are valid by determining whether the stored queried metadata information leads to the retrieval of the requested data file. Furthermore, the file modifications may include deletion of the requested data files, changing of the file paths to the requested data files, and renaming of the requested data files. For example, the computer cluster data retrieval program 108A, 108B (FIG. 1) may receive a data retrieval request on a local server 202a (FIG. 2) that includes a request for the data file A. Thereafter, based on the queried metadata information stored on the node associated with the data file A from a previous data retrieval request for the data file A, the computer cluster data retrieval program 108A, 108B (FIG. 1) may determine whether the queried metadata is valid, and in response to the determination that the stored queried metadata information associated with the data file A is not valid based on file modifications to the data file A, the computer cluster data retrieval program 108A, 108B (FIG. 1) may update the stored queried metadata information associated with the data file A based on the file modifications to data file A.

Figure 4:
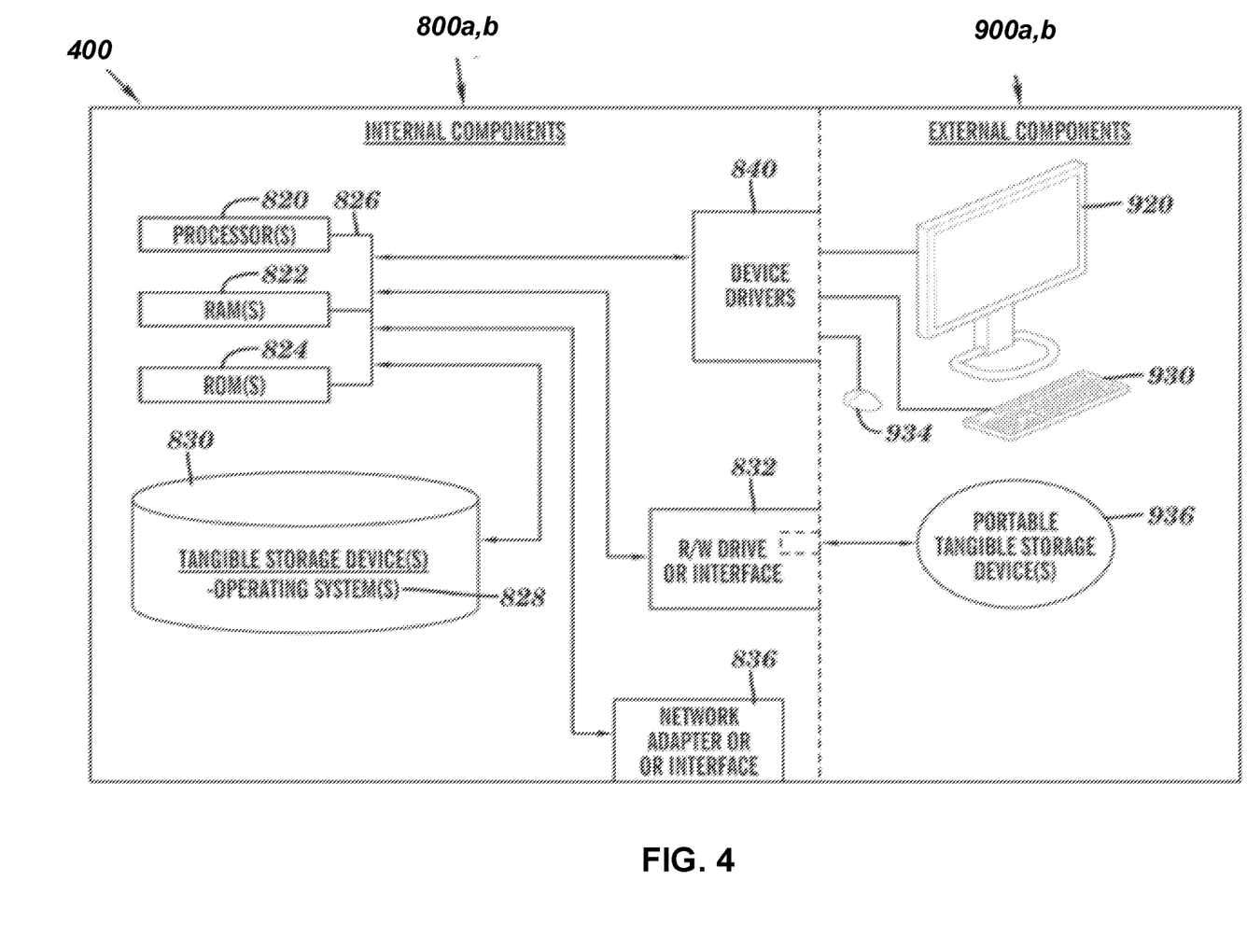
FIG. 4 is a block diagram of the system architecture of a program for selectively retrieving requested data files associated with a computer cluster system based on metadata associated with the requested data files according to one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800a, b and external components 900a, b illustrated in FIG. 4. Each of the sets of internal components 800a, b includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the computer cluster data retrieval program 108A (FIG. 1) in client computer 102 (FIG. 1), and the computer cluster data retrieval program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a computer cluster data retrieval program 108A and 108B (FIG. 1), can be stored on one or more of the respective portable computer-readable tangible storage devices 936, read via the respective R/W drive or interface 832, and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The computer cluster data retrieval program 108A (FIG. 1) and software program 114 (FIG. 1) in client computer 102 (FIG. 1), and the computer cluster data retrieval program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the computer cluster data retrieval program 108A (FIG. 1) and software program 114 (FIG. 1) in client computer 102 (FIG. 1) and the computer cluster data retrieval program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930, and computer mouse 934. The device drivers 840, R/W drive or interface 832, and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
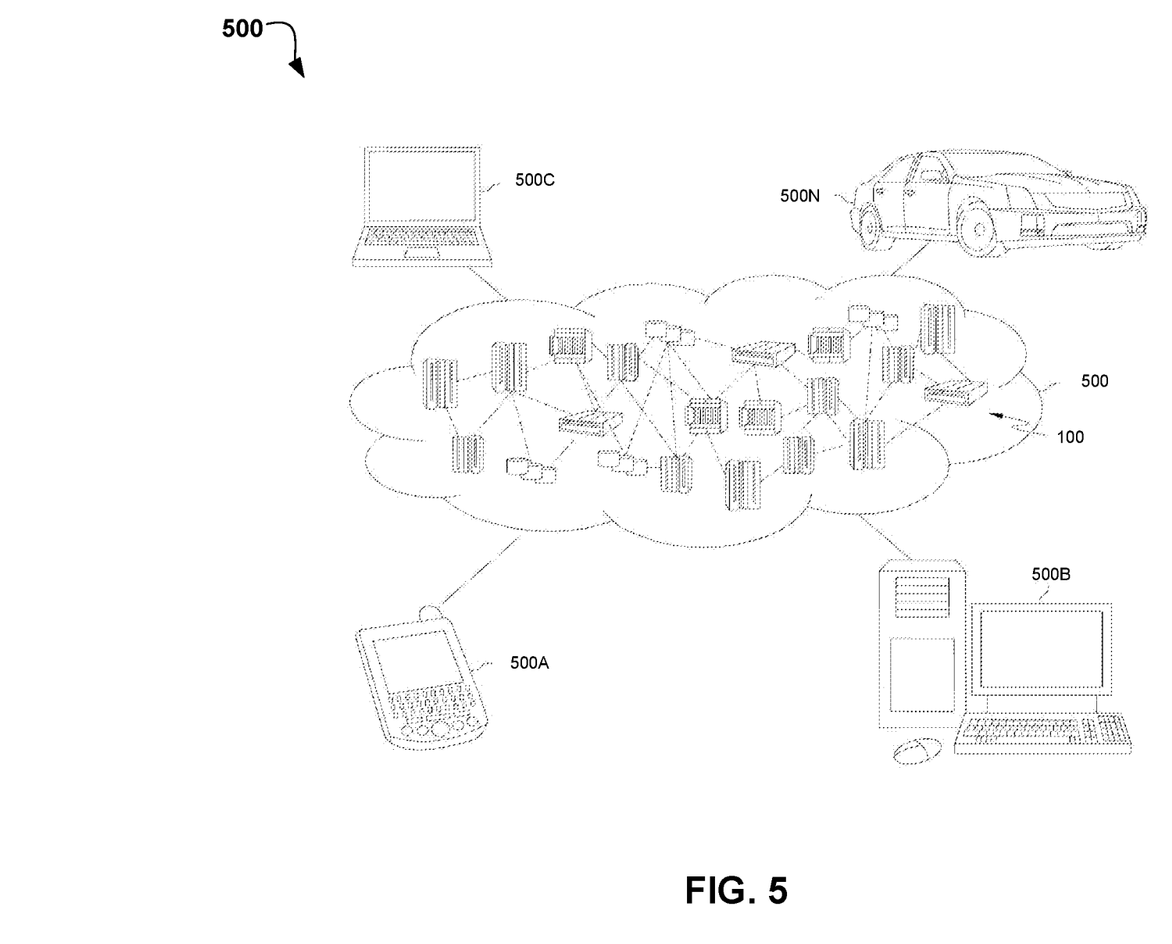
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
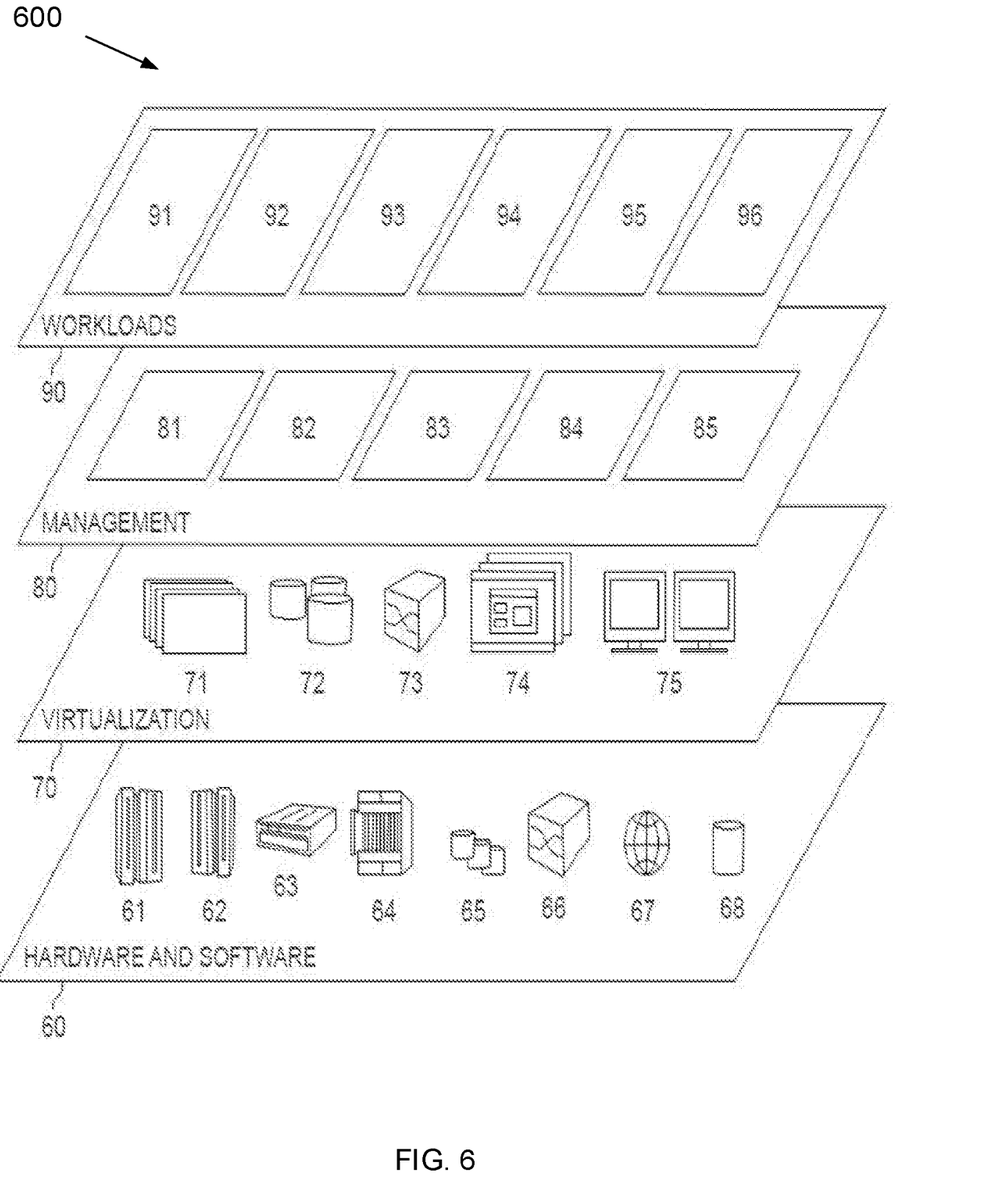
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computer cluster data retrieval 96. A computer cluster data retrieval program 108A, 108B (FIG. 1) may be offered "as a service in the cloud" (i.e., Software as a Service (SaaS)) for applications running on mobile devices 102 (FIG. 1) and selectively retrieve requested data files associated with a computer cluster system based on metadata associated with the requested data files.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for selectively retrieving at least one requested data file associated with at least one computer cluster system comprising a plurality of local and remote clusters based on a plurality of metadata associated with the at least one requested data file, the method comprising:

receiving at least one data retrieval request on a server associated with the at least one computer cluster system, wherein the at least one data retrieval request includes a request to retrieve the at least one requested data file;

querying the plurality of metadata associated with the at least one requested data file, wherein querying the plurality of metadata comprises determining a proximity of at least one data block to the server that receives the at least one data retrieval request by accessing a server directory on nodes associated with the plurality of local and remote clusters;

based on the queried plurality of metadata and the proximity of the at least one data block to the server that received the at least one data retrieval request, determining at least one server associated with the plurality of local and remote clusters that is available and provides an optimum access to the at least one requested data file;

in response to a determination that the at least one requested data file is stored on two or more servers in the at least one computer cluster system, determining an amount of data blocks allocated to each of the two or more servers for the at least one requested data file; and based on the proximity, and in response to the determination that a first server associated with the two or more servers comprises more data blocks allocated to the at least one requested data file than a second server associated with the two or more servers, selecting the first server to provide the optimum access to retrieve the at least one requested data file.

2. The method of claim 1, wherein the at least one computer cluster system includes at least one remote cluster and at least one local cluster.

3. The method of claim 2, wherein the at least one remote cluster and the at least one local cluster is selected from the group consisting of a share nothing cluster and a share everything cluster.

4. The method of claim 2, wherein receiving the at least one data retrieval request further comprises:

receiving the at least one data retrieval request on at least one node associated with a plurality of interconnected nodes on the at least one remote cluster and the at least one local cluster.

5. The method of claim 2, wherein the queried plurality of metadata is selected from the group consisting of a plurality of inode information associated with the at least one local cluster and the at least one remote cluster based on the at least one requested data file, a number of data blocks allocated to the at least one requested data file, a plurality of data block information based on the at least one requested data file, a location of at least one data block that may store the at least one requested data file, and a locality of servers that stores the at least one requested data file, wherein the locality is based on the proximity of the requested data file to the servers.

6. The method of claim 2, further comprising:

storing the queried plurality of metadata on at least one node associated with a plurality of interconnected nodes on the at least one remote cluster and the at least one local cluster.

7. The method of claim 6, further comprising:

updating the stored queried plurality of metadata in response to modifications to the at least one requested data file.

8. A computer system for selectively retrieving at least one requested data file associated with at least one computer cluster system comprising a plurality of local and remote clusters based on a plurality of metadata associated with the at least one requested data file, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

receiving at least one data retrieval request on a server associated with the at least one computer cluster system, wherein the at least one data retrieval request includes a request to retrieve the at least one requested data file;

querying the plurality of metadata associated with the at least one requested data file, wherein querying the plurality of metadata comprises determining a proximity of at least one data block to the server that receives the at least one data retrieval request by accessing a server directory on nodes associated with the plurality of local and remote clusters;

based on the queried plurality of metadata and the proximity of the at least one data block to the server that received the at least one data retrieval request, determining at least one server associated with the plurality of local and remote clusters that is available and provides an optimum access to the at least one requested data file;

in response to a determination that the at least one requested data file is stored on two or more servers in the at least one computer cluster system, determining an amount of data blocks allocated to each of the two or more servers for the at least one requested data file; and based on the proximity, and in response to the determination that a first server associated with the two or more servers comprises more data blocks allocated to the at least one requested data file than a second server associated with the two or more servers, selecting the first server to provide the optimum access to retrieve the at least one requested data file.

9. The computer system of claim 8, wherein the at least one computer cluster system includes at least one remote cluster and at least one local cluster.

10. The computer system of claim 9, wherein the at least one remote cluster and the at least one local cluster is selected from the group consisting of a share nothing cluster and a share everything cluster.

11. The computer system of claim 9, wherein receiving the at least one data retrieval request further comprises:

receiving the at least one data retrieval request on at least one node associated with a plurality of interconnected nodes on the at least one remote cluster and the at least one local cluster.

12. The computer system of claim 9, wherein the queried plurality of metadata is selected from the group consisting of a plurality of inode information associated with the at least one local cluster and the at least one remote cluster based on the at least one requested data file, a number of data blocks allocated to the at least one requested data file, a plurality of data block information based on the at least one requested data file, a location of at least one data block that may store the at least one requested data file, and a locality of servers that stores the at least one requested data file, wherein the locality is based on the proximity of the requested data file to the servers.

13. The computer system of claim 9, further comprising:
storing the queried plurality of metadata on at least one node associated with a plurality of interconnected nodes on the at least one remote cluster and the at least one local cluster.

14. The computer system of claim 13, further comprising:
updating the stored queried plurality of metadata in response to modifications to the at least one requested data file.

15. A computer program product for selectively retrieving at least one requested data file associated with at least one computer cluster system comprising a plurality of local and remote clusters based on a plurality of metadata associated with the at least one requested data file, comprising:
one or more computer-readable storage devices and program instructions stored on at least one of the one or more tangible storage devices, the program instructions executable by a processor, the program instructions comprising:
program instructions to receive at least one data retrieval request on a server associated with the at least one computer cluster system, wherein the at least one data retrieval request includes a request to retrieve the at least one requested data file;
program instructions to collect the plurality of metadata associated with the at least one requested data file associated with the received at least one data retrieval request, wherein querying the plurality of metadata comprises determining a proximity of at least one data block to the server that receives the at least one data retrieval request by accessing a server directory on nodes associated with the plurality of local and remote clusters;
based on the queried plurality of metadata and the proximity of the at least one data block to the server that received the at least one data retrieval request, program instructions to determine at least one server associated with the plurality of local and remote clusters that is available and provides an optimum access to the at least one requested data file;
in response to a determination that the at least one requested data file is stored on two or more servers in the at least one computer cluster system, program instructions to determine an amount of data blocks allocated to each of the two or more servers for the at least one requested data file; and
based on the proximity, and in response to the determination that a first server associated with the two or more servers comprises more data blocks allocated to the at least one requested data file than a second server associated with the two or more servers, program instructions to select the first server to provide the optimum access to retrieve the at least one requested data file.

16. The computer program product of claim 15, wherein the at least one computer cluster system includes at least one remote cluster and at least one local cluster.

17. The computer program product of claim 16, wherein the program instructions to receive the at least one data retrieval request further comprises:
program instructions to receive the at least one data retrieval request on at least one node associated with a plurality of interconnected nodes on the at least one remote cluster and the at least one local cluster.

18. The computer program product of claim 16, wherein the queried plurality of metadata is selected from the group consisting of a plurality of inode information associated with the at least one local cluster and the at least one remote cluster based on the at least one requested data file, a number of data blocks allocated to the at least one requested data file, a plurality of data block information based on the at least one requested data file, a location of at least one data block that may store the at least one requested data file, and a locality of servers that stores the at least one requested data file, wherein the locality is based on the proximity of the requested data file to the servers.

19. The computer program product of claim 16, further comprising:
program instructions to store the queried plurality of metadata on at least one node associated with a plurality of interconnected nodes on the at least one remote cluster and the at least one local cluster.

20. The computer program product of claim 19, further comprising:
program instructions to update the stored queried plurality of metadata in response to modifications to the at least one requested data file.

* * * * *